UNITED STATES PATENT OFFICE.

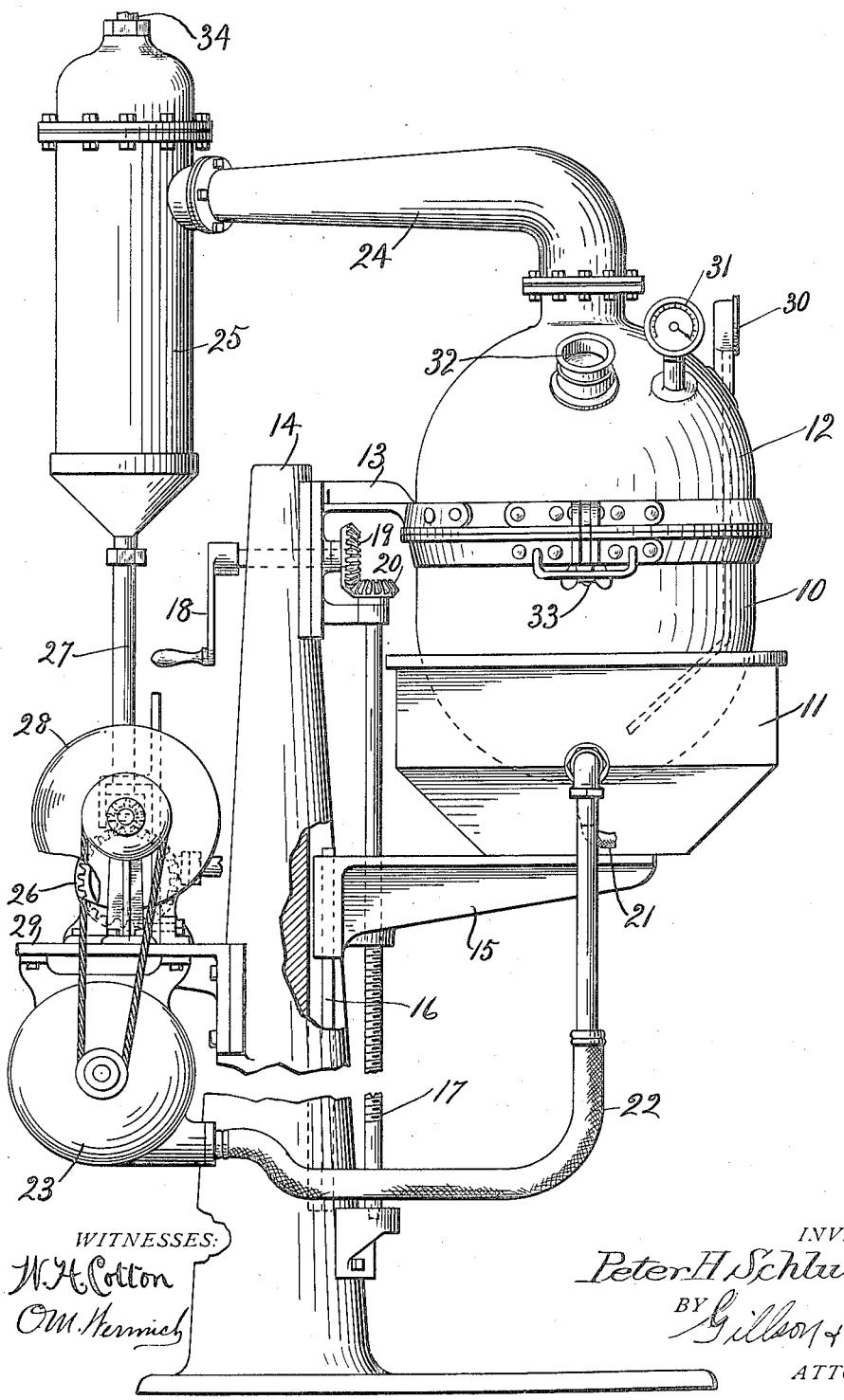

PETER H. SCHLUETER, OF CHICAGO, ILLINOIS.

PROCESS OF MAKING CANDY.

1,101,572.   Specification of Letters Patent.   Patented June 30, 1914.

Application filed January 16, 1914. Serial No. 812,371.

*To all whom it may concern:*

Be it known that I, PETER H. SCHLUETER, a citizen of the United States, and resident of Chicago, county of Cook, and State of Illinois, have invented certain new and useful Improvements in Processes of Making Candy, of which the following is a specification and which are illustrated in the accompanying drawings, forming a part thereof.

The invention relates to the manufacture of candy and more particularly to the manufacture of that class of candies which are commonly known as hard goods and which include fruit drops, stick candy and the like. The invention contemplates an improved process of manufacturing these candies, and the object of the invention is to provide a process of making candy which may be readily carried on and which will produce goods having an improved appearance, flavor and keeping quality.

One form of apparatus which may be employed in practising the invention is illustrated in the accompanying drawings, the same showing a side elevation of the apparatus with some of the parts broken away.

In practising the invention pure cane sugar may be employed with the addition of other material only in sufficient quantities to prevent the reversion or graining of the sugar after cooking. For this purpose any reversion preventing agent, such as cream of tartar, glucose, natural lemon juice or citric acid, and tartaric acid may be employed. Cream of tartar is preferably employed. In this event pure cane sugar with the addition of cream of tartar in the proportion of one ounce of cream of tartar to about fifty pounds of sugar is used. If glucose is substituted for the cream of tartar the glucose must be used in the proportion of not less than 25 per cent. of the weight of sugar, but a less proportion may be used if some cream of tartar is also added. Either of the above mixed materials is cooked with water in the proportion of one gallon of water to thirty pounds of material. The cooking is to first proceed at substantially atmospheric pressure as in an open vessel. This cooking is continued until the batch attains a temperature above that commonly referred to as the "cracking point" but is not to proceed to completion. In practice I have found it desirable to continue the cooking only until the batch attains a temperature corresponding to 265 degrees F. at sea level. A vacuum of 24 to 27 inches of mercury is then applied while the mass is still hot but preferably without any further application of heat. This application of the indicated vacuum is desirably continued for about five minutes when thirty pounds of sugar has been used. The batch will then be found to be cooked to about the same consistency as if heated in open air to a temperature corresponding to 340 degrees F. at sea level, but will be substantially transparent and colorless. When poured upon the slab the material may be treated in any of the usual ways employed for finishing hard goods with the result that the product will have an improved finish and keeping quality and will be sweeter than candy produced by cooking sugar to a higher temperature. Furthermore, the cooking of the candy will have required less time than if the entire operation had been carried on in the open air and as the material is already partially cooled when poured upon the slab the further treatment of the same may proceed almost immediately.

In the accompanying drawing a kettle within which the batch may be cooked, as above described, is indicated at 10. This kettle is desirably removably supported upon a gas furnace 11. For permitting the cooking to be practised both in the open air and under vacuum, the kettle 10 is shown as being vertically alined with a hood 12 and the two are supported for relative vertical movement. Preferably the hood 12 is fixedly supported, as through a bracket arm 13. This projects laterally from the top of a standard 14. In this instance the kettle 10 is moved to and from the hood 12 by raising and lowering the kettle. To this end the furnace 11 is mounted upon a bracket arm 15 and this bracket arm is slidingly connected to the standard 14, as by having its inner end mounted in a vertical slide way 16 of the standard. An upright shaft 17 having threaded engagement with the bracket 15 and operated through a crank 18 and beveled gears 19, 20, provide a convenient means for raising and lowering the bracket 15 to correspondingly raise and lower the kettle 10. The furnace 11 is supplied with gas through a pipe 21 and with air blast through a pipe 22, the latter leading from a blower 23.

An elbow 24 permanently connects the hood 12 with a condenser 25 and the foot of the condenser is connected with a vacuum pump 26, as through a pipe 27. An electric motor 28 serves both for operating the blower 23 and vacuum pump 26. For this purpose the blower 23, vacuum pump 26 and motor 28 are desirably supported upon a shelf 29 secured to the back of the standard 14, and are operatively connected by mechanism including clutches, all as more fully appears in my application for patent on cooking vessel filed September 5, 1913, Serial No. 788,256. The hood 12, preferably supports a thermometer 30 in position to enter the kettle 10 when the latter is raised in contact with the hood. Also a vacuum gage 31 and sight glass 32.

For cooking the batch in the open air, as described, the kettle 10 is conveniently supported below the hood 12 but separated therefrom. When the said temperature of 265 degrees F. has been attained, the kettle 10 is raised to a position in which its rim contacts with the rim of the hood 12 and the two are united, as by clamps, one of which is shown at 33. It will be understood that this raising of the kettle is conveniently accomplished by turning the crank 18. The fire in the furnace 11 may now be reduced or extinguished, and the pump 26 operated in connection with the introduction of water into the condenser 25, as through a pipe 34, to produce the desired vacuum over the batch in the kettle 10. When the operation is completed, the clamps, as 33, are loosened and the kettle 10 again lowered. It will usually be found desirable to momentarily operate the furnace again at this time to insure that the kettle 10 is sufficiently warmed to permit the batch to be poured therefrom when the kettle is removed from the furnace. Should any cooked material adhere to the inner wall of the hood 12, the operation of cooking a subsequent batch in the kettle 10 below the hood when the hood and kettle are separated will so steam the inner wall of the hood as to insure such material being melted and mingling with the batch in the kettle before the hood and kettle are again united. This is desirable as it has been found that if material adheres to the inner wall of the hood from a previous batch and mingles with a subsequent batch during that part of the cooking operation in which a vacuum is applied there would be a tendency to granulation or reversion in the new batch, when poured.

Except where otherwise specifically stated, the term "sugar" is here used as including glucose. It will be understood that in event no cane sugar is used and the batch is composed entirely of glucose, no reversion preventing agent will be required.

I claim as my invention,—

1. The process of making candy which consists in cooking a solution of cane sugar and a reversion preventing agent at atmospheric pressure to a temperature higher than the cracking point but insufficient to complete the cooking operation and in then subjecting the batch to a vacuum until cooked without raising the temperature above that attained at atmospheric pressure.

2. The process of making candy which consists in cooking a solution of cane sugar and cream of tartar in about the proportions of one ounce of cream of tartar to fifty pounds of sugar at substantially atmospheric pressure to a temperature corresponding to about 265 degrees F. at sea level and in then subjecting the batch to a vacuum of approximately twenty-five inches of mercury while hot but without the further application of heat for a period of five minutes.

3. The process of making candy which consists in cooking sugar syrup at atmospheric pressure to a temperature higher than the cracking point but insufficient to complete the cooking operation and in then subjecting the batch to a vacuum until cooked without raising the temperature above that obtained at atmospheric pressure.

PETER H. SCHLUETER.

Witnesses:
Charles B. Gillson,
E. M. Klatcher.